United States Patent [19]
Horowitz et al.

[11] Patent Number: 6,122,647
[45] Date of Patent: Sep. 19, 2000

[54] DYNAMIC GENERATION OF CONTEXTUAL LINKS IN HYPERTEXT DOCUMENTS

[75] Inventors: Damon M. Horowitz; Earl F. Rennison; Joseph W. Ruffles; Lisa S. Strausfeld, all of San Francisco, Calif.

[73] Assignee: Perspecta, Inc., San Francisco, Calif.

[21] Appl. No.: 09/081,695

[22] Filed: May 19, 1998

[51] Int. Cl.$^7$ .................................................. G06F 17/21
[52] U.S. Cl. ................................ 707/513; 707/3; 707/5; 707/514; 707/531
[58] Field of Search .................................. 707/3, 10, 513, 707/531, 514, 5, 201

[56] References Cited

U.S. PATENT DOCUMENTS

| | | | |
|---|---|---|---|
| 5,708,825 | 1/1998 | Sotomayor | 395/762 |
| 5,778,363 | 7/1998 | Light | 707/5 |
| 5,920,859 | 7/1999 | Li | 707/5 |
| 5,987,460 | 11/1999 | Niwa et al. | 707/6 |
| 6,006,242 | 12/1999 | Poole et al. | 707/531 |

*Primary Examiner*—Jean R. Homere
*Attorney, Agent, or Firm*—Fenwick & West LLP

[57] ABSTRACT

A system, method, and software product create contextual hypertext links relevant to a user selected portion of a source document. The contextual links enable the user to dynamically associate the source document with any available target document, regardless of whether links where created between the source document and the target document when the source document was created. The method includes selecting terms relevant to the user selected portion by linguistic analysis which selects the most frequently occurring terms. From the selected terms target documents relevant to the selected terms are identified. The target documents are selected by identifying topics that are associated with, or described by, the selected terms. Contextual links are created between the selected terms and target documents associated with the identified topics using the URLs for the documents in the contextual links. The system includes a knowledge base of topics, including hierarchical relations between topics, and associations of topics and terms. A document collection includes documents and references to documents, and URL or other addressing information for the documents. A tagging module receives a user selected portion and selects terms to be used for the contextual links. A presentation module identifies the topics in the knowledge base associated with the selected terms, the documents associated with each topic, and creates the hypertext links between the terms and the documents.

13 Claims, 10 Drawing Sheets

DYNAMIC GENERATION OF CONTEXTUAL LINKS IN HYPERTEXT DOCUMENTS

BACKGROUND

1. Field of Invention

The present invention relates generally to information retrieval systems and methods, and more particularly, to the dynamic generation of context dependent navigation information between documents in an information retrieval system.

2. Background of the Invention

The World Wide Web is today's most commonly used information retrieval system. One of the distinguishing features of documents on the World Wide Web (and of intranets) is the use of hypertext links that associate a portion of one document with another document, which may be located on any computer system coupled to the Internet or a local intranet and supporting the appropriate communication protocols. A hypertext link (or simply 'link') is typically defined by a selected term or set of terms in a source document, and the network location of the target document, expressed as a uniform resource locator or URL. A hypertext link may also be associated with portions of images or control features such as buttons, menus, and the like. Hypertext links allow a user to navigate from the source document to the target document by activation of the link and thereby retrieve the target document in this fashion.

In conventional hypertext documents, links are statically defined. This means that either the term(s) used in the source document from which the link originates (the anchors), or the target document of the link are determined when the source document is created. For most hypertext documents, the links are completely static: the publisher manually determines which terms of a source document will be the anchors and which documents will be the targets. When a user accesses the source document, the links are provided exactly as defined by the publisher.

This paradigm has several significant drawbacks. First, because the links are manually defined, they require manual effort to create, update, or remove from a document. The publisher must decide which terms (or other portions of a document, e.g., images) will be used, and which documents will be the targets. The publisher must exercise editorial judgment in selecting both these terms in the source document, and particularly in selecting the target documents. However, because the available content on the Internet, and in most intranets, is continuously changing, the publisher is unlikely to know all of the possible target documents that may be relevant for a given link.

Second, once the links are defined by the publisher, the user who accesses the source document has no ability to redefine them.

Third, a link can only refer to documents that exist at the time the link is defined. Thus, after the source document and its links are defined, it can be immediately out of date if it does not contain links to relevant documents that have been subsequently created. Further, as new content emerges on the Internet or local intranet, manual changes by the publisher are needed to update the existing links to refer to such new content.

Systems do exist on the World Wide Web which present new links to a user in response to user inquiries, such as Internet search engines like AltaVista™. However, these systems present a very limited navigation paradigm. FIG. 1 illustrates the iterative navigation paradigm and usage flow of conventional search engines. With a search engine, the user must manually enter a set of keyword search terms which the user believes are related to a topic of interest. In response, the search engine returns a document with links to other documents (here D1 . . . Dn) which satisfy the query, and hopefully provide information related to the user's topic of interest. Once the user accesses one of the referenced documents Dn, however, he is out of the 'scope' of the search engine, and any further navigation is limited to the links to other documents J1 . . . Jn that have been statically defined in the referenced document Dn (and to the children of such documents). To access any of the other documents that satisfy the user's initial query, the user must navigate back to the search engine results, and proceed from there, iteratively accessing the search result documents D one by one. If the user wants to refine or modify the query, the user returns to the search engine and inputs a new query, and generates a completely new set of search results (which may, by the vagaries of search engines, result in a completely different set of documents).

The problem with this search paradigm is that search engine's capabilities are only available at the initial point of the user inputting their search inquiry. Once the user accesses a referenced document in the search result set, the search engine is incapable of providing any analysis of the referenced document, and in particular is unable to dynamically analyze the target document's content or generate any new links from that target document to other documents that may be available or relevant. Again, the user is limited to only those links in the target document that have been established by the publisher.

Accordingly, it is desirable to provide a system and method of navigation of documents in an information retrieval system generally, and on the World Wide Web and intranets particularly, that can dynamically analyze the contents of any target document being accessed by a user and generate new hypertext links to other documents that may be relevant to the target document.

SUMMARY OF THE INVENTION

The present invention overcomes the limitations of conventional information retrieval systems generally, and conventional Internet and intranet search engines particularly, by providing a system and method that dynamically generates contextual hypertext links in a source document to other topically relevant documents in response to the content of the source document or user-selected portion thereof. These new links are contextual links because they are generated in specific response to the content of a selected portion of the source document.

More particularly, the contextual links are generated by a linguistic analysis of the selected portion which identifies particular terms that are of interest or about the selected portion, or otherwise relevant to it. From the identified terms, a number of target documents are selected that are relevant to these terms, and the contextual links are made between the source document and the target documents. The selected terms may serve as link anchors for the contextual links, or the contextual links may be embedded in a separate navigational component, such as a menu bar.

Where the links are generated in response to the user's access or command at the time the source document is accessed (rather than when the source document is authored by the publisher or instantiated by a search engine) both the terms that serve as the anchors of the links and the target documents of the links can be dynamically determined. This allows a link in a source document to reference not only target documents that existed at the time the source document is originally authored, but also to new target documents or web content that is published after the source document is authored or published by the publisher. This allows the user to always have links from a document to relevant other documents that are on the Internet or a local intranet.

Further, because the contextual links in a source document are generated at the time of user access, the user can "forward navigate" through any number of documents, while continuously refining or altering the focus of interest. For example, a user can specify his focus of interest by selecting a region of text in a source document. The selected text is analyzed and the contextual links are dynamically generated, based on the content of the selected text, to other target documents that are topically relevant to the selected text. In other words, unlike a search engine which only responds to specific search inquires and generates a limited set of documents, the present invention can treat any document (or portion of a document) a user is viewing as an inquiry and create new links in the source document to other related documents.

The present invention may be embodied in various forms. In one embodiment, the present invention provides a computer-implemented process in which a portion of text of a source document is analyzed and a number of topics are determined as being representative of what the selected portion is about. Topic analysis may be determined by various syntactic and semantic processes, such as identification and frequency analysis of terms of the selected portion. For each of the topics, a new tag is added to the source document. A tag includes a term, preferably from the text of the document, and a reference to the topic associated with the term. These tags are preferably stored with the source document.

A knowledge base or other data repository stores information associating individual topics with sets of documents related to the topic, and with terms descriptive of the topic. Preferably each document has a URL or other addressing information for accessing the document over a network. Each of the tags provided with the source document is used to determine a topic associated with the tag in the knowledge base, thereby identifying the topic(s) associated with the term in the tag. Links to the documents associated with the topic are then created. The links may be instantiated in two ways. First, the links can be established using the terms of the source document which generated the tags as link anchors. In many cases, there will be a number of target documents relevant to each selected term, and hence multiple links to be created for the term. Where there are multiple links for a selected term, a popup menu with the multiple links may be created in the document body and anchored at the selected term. Thus, each selected term can become a menu of links to other documents relevant to the term, and not merely to one document. Alternatively, the various links may be displayed in a separate navigational component, such as a navigational bar or menu, apart from the body of the source document, with the keyword or terms used in the navigational component as link anchors therein.

Another embodiment of the present invention is as a computer-implemented system including a tagging module, a presentation module, a knowledge base, and a document collection. The tagging module receives as input a user selected portion of a source document and determines the topics relevant to the user selected portion, and creates a set of tags, each tag associating a term of the selected portion to one or more topics in the knowledge base. The presentation module receives the document and its set of tags, determines from the knowledge base the topics associated with each tag, and the target documents associated with each topic. The presentation module adds links to these target documents to the source document, either as links in the document body where one or more of the keywords appears, or in a separate navigational component.

One embodiment of such a system is a Web site for either the World Wide Web portion of the Internet or an intranet based on Web protocols, such as TCF-IP, HyperText Transfer Protocol, and HTML. In this embodiment, the Web site includes a server that manages a document collection of Web pages or other web content, and knowledge base of topics. Client software, such as a browser executes on remote clients, and communicates with the server via a network. Initially, the client requests a page, which is provided by the server from the document collection, and displayed to the user. The user selects a portion of the displayed page and passes this back to the server. The server includes the tagging module which generates the tags for the selected portion, and the presentation module which dynamically constructs a new page containing contextual hyperlinks for the generated tags. The server then returns the new page to the client for display. The user can then select from among the hyperlink to access various target documents.

The present invention supports three distinct usage scenarios. First, the present invention may be used as described above whereby the user causes the dynamic generation of both tags and links in a source document to reflect or refine their focus of interest. This enables the user to effectively customize a document by generating links appropriate to her interests. Because the tags identifying the terms of interest are dynamically generated, the user has full control over the semantic content that is used to define the contextual links to other documents.

Second, the present invention may be used with the static (off-line) generation of tags, and the dynamic (real-time) generation of contextual links. In this scenario, during creation of a web site, the publisher uses the present invention to automatically generate the tags for a document to be included in the web site. These tags will be fixed at this point, establishing the terms or phrases in the document that the user will be allowed to update to contextual links to other documents. Subsequently, when the document is accessed by a user, the tags are already determined, but contextual links are then dynamically determined to available target documents. This scenario permits the contextual links in the source document to be current at all times, while giving the publisher editorial control over which tags and keywords are used as the basis for the contextual links.

Finally, the present invention can be used for both static creation of tags and contextual links. In this scenario the publisher again automatically generates tags for a document to be published, that is, automatically selecting the terms of the document that will serve as the basis of the contextual links, rather than manually defining the tags. In addition, the publisher also uses the present invention to automatically generate the contextual links for the document. The document then is published on the web site; the tags and contextual links are fixed when accessed by the user. However, the publisher is able at any time to update the tags or links of the document using the automatic generation capabilities of the present invention.

DETAILED DESCRIPTION OF THE PREFERRED EMBODIMENT

System Overview

Figure 1:
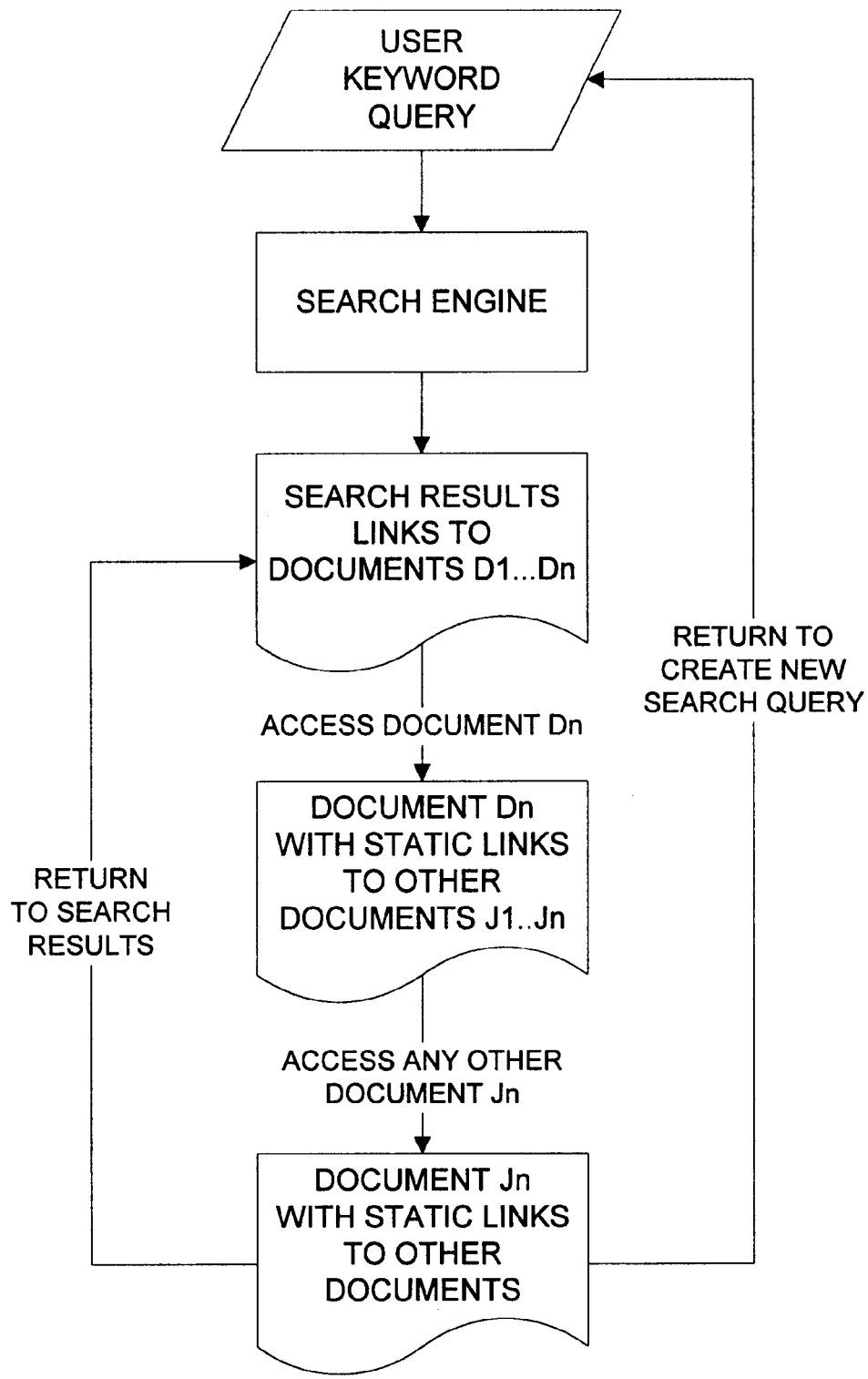
FIG. 1 is an illustration of the conventional navigation paradigm for accessing hypertext documents using search engines.
Figure 2:
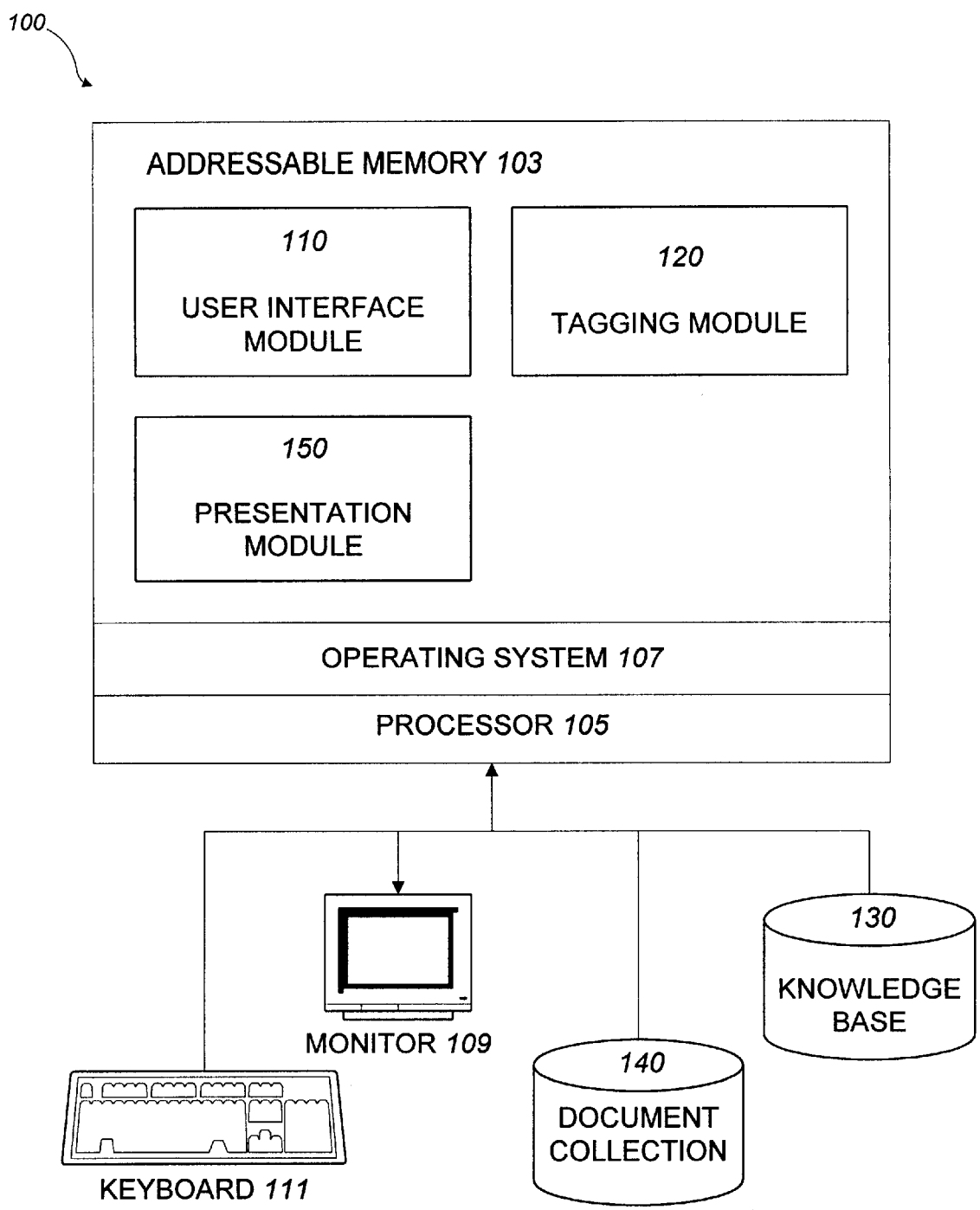
FIG. 2 is an illustration of a system in accordance with the present invention.

Referring now FIG. 2 there is shown an illustration of the software architecture of an information retrieval system 100 in accordance with the present invention. The information retrieval system 100 includes various functional software modules and structures that execute on a conventional computer system. The computer system includes a processor 105, addressable memory 103, operating system 107, display device 109, and user input device, such as a keyboard 111 or a mouse.

Referring to the figure, the information retrieval system 100 includes a user interface module 110, a tagging module 120, a presentation module 150, a knowledge base 130, a document collection 140. These software modules and structures configure and control the computer system to operate in accordance with the present invention. The various modules may be provided to the system 100 as software products stored on computer readable media such as CD-ROMs or the like.

The user interface module 110 is responsible for providing a user interface to the information retrieval system 100 including receiving user input queries, displaying query results including hypertext documents, and receiving user selections of portions of any displayed document.

The knowledge base 130 is a persistent data store that system 100 uses to store topic information. The knowledge base 130 comprises an arbitrary number of topics. Each topic is associated with one or more terms that are synonyms for each other. A term is a word or series of words (e.g., a noun phrase) that refer to a topic. A topic describes a possible subject annotation for documents in the document collection 140.

One implementation of the knowledge base 130 may store the topics and terms in a topic-term table with the following structure for each entry: {Topic, TermList}, where TermList is a list of terms. Each topic in the knowledge base 130 may have a unique topic ID code for cross-referencing in other tables. Other implementations of the knowledge base 130 may store the topic and term associations in various other formats.

The knowledge base 130 further contains a number of topics linked together in various hierarchical interconnected graphs by relations. A topic may have any number of relationships to other topics. Each relationship defines a semantic relationship between two topics, and has a predefined type. Relationship types include, for example, parent and child relationships (e.g., "is-a" or "type-of"). An implementation of the knowledge base 130 may store the topic relationships in a topic relationship table with the following structure for each entry: {Topic, Topic, Relationship}. An object-oriented implementation may store the topic hierarchy in a plurality of topic objects and relation objects. The knowledge base 130 may also include a full index of all topics and terms. The system administrator creates and administers the knowledge base 130 off-line.

The document collection 140 is a set of documents and references to documents. Each stored document contains any variety of content, including text, graphics, audio, video, multimedia, or any combination of media data types, preferably structured in a hypertext format or hypertext markup language. A document also has meta-data which classifies the document. The meta-data may include items such as document identifier, title, author, date, publication, industry codes, and the like. Each document also has a network location, preferably specified as a uniform resource locator (URL) for accessing documents using the HyperText Transport Protocol (HTTP); documents may reside locally in the document collection 140, or anywhere on the Internet. If only a reference to a document is stored, the stored data include the URL and the meta-data.

In addition, each document (and document reference) has an association with at least one topic in the knowledge base 130, and preferably with many topics. For example, a document about training Siberian Husky dogs for the Iditarod sled race may have associations with topics such as "Siberian Husky," "dog," "sled racing," "Alaska," "Iditarod," "endurance sports," and the like. In a preferred implementation, the association of a document and a topic is in the form of a tag. A tag is a structure that associates a topic in the knowledge base 130 with a portion of a document that the topic is about, and which portion can be used as a link to other data. The portion may be any part of the document, such as one more terms in the document text, an image, or any other content. The tags are preferably stored within the document itself, or with the document reference. Alternatively, tags may be stored in the knowledge base 130 in a tag table, with each tag entry associating a topic and portion of a document.

The document collection 140 may also contain a complete index of all terms in all locally stored documents and references.

The tagging module 120 is responsible for analyzing a selected portion of a document, identifying a set of terms and topics that are relevant to the selected portion or about the selected portion, and generating tags in the document which associate the terms and topics. The tagging module 120 may apply a variety of linguistic analysis techniques to identify the relevant topics.

The presentation module 150 is responsible for determining a set of target documents associated with the generated tags in a document, and constructing a set of hypertext links to the target documents.

The system architecture shown in FIG. 2 is merely illustrative, and encompasses various implementations. For example, the user interface module 110 may be part of a client software product (executing on either the same or physical separate computer system) that interfaces with a server software product containing the tagging module 120, presentation module 150, knowledge base 130 and document collection 140.

Navigation Paradigm

Figure 3:
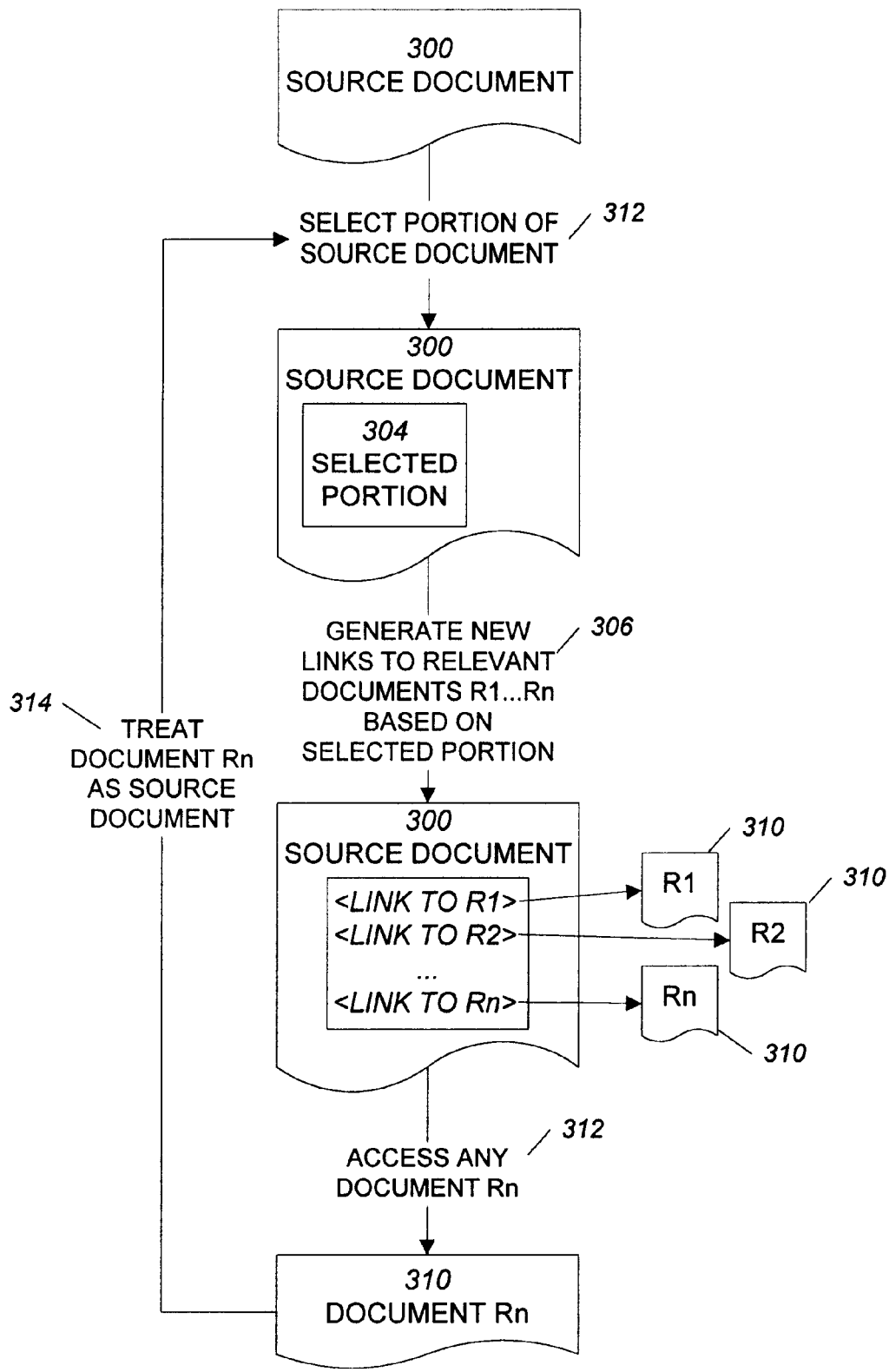
FIG. 3 is an illustration of the navigation paradigm in accordance with the present invention.
Figure 4A:
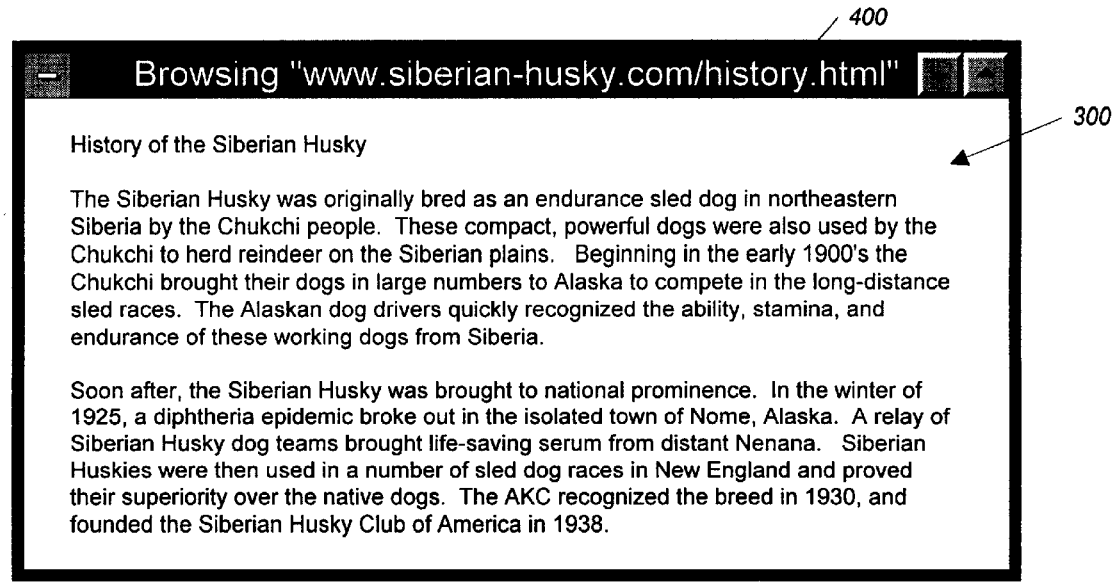
FIGS. 4a–4d are illustrations of an example user interface for browsing hypertext documents in accordance with the present invention.
Figure 4B:
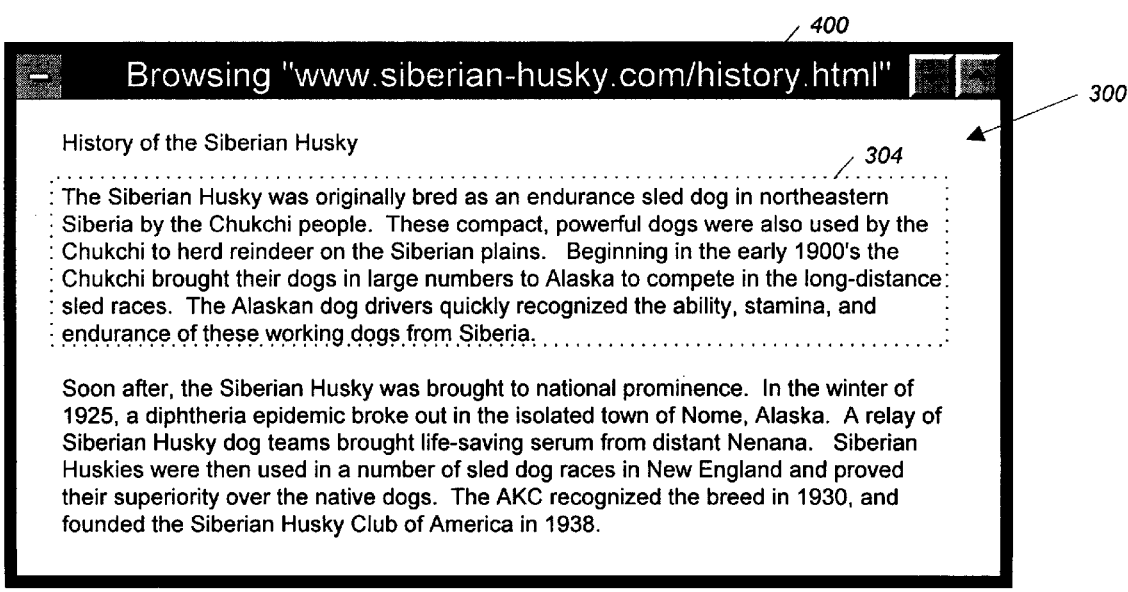
Figure 4C:
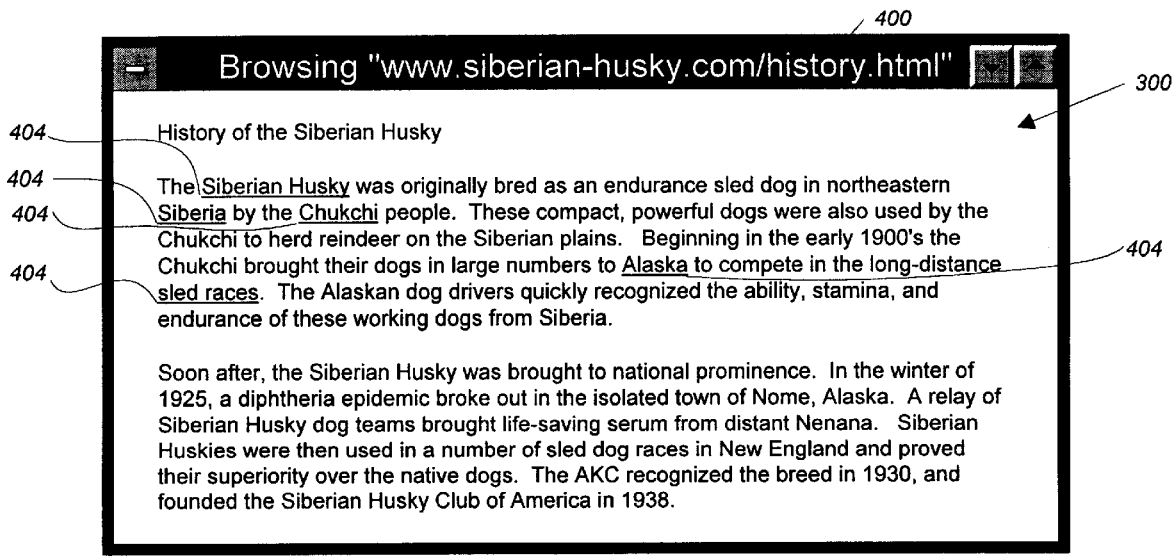
Figure 5:
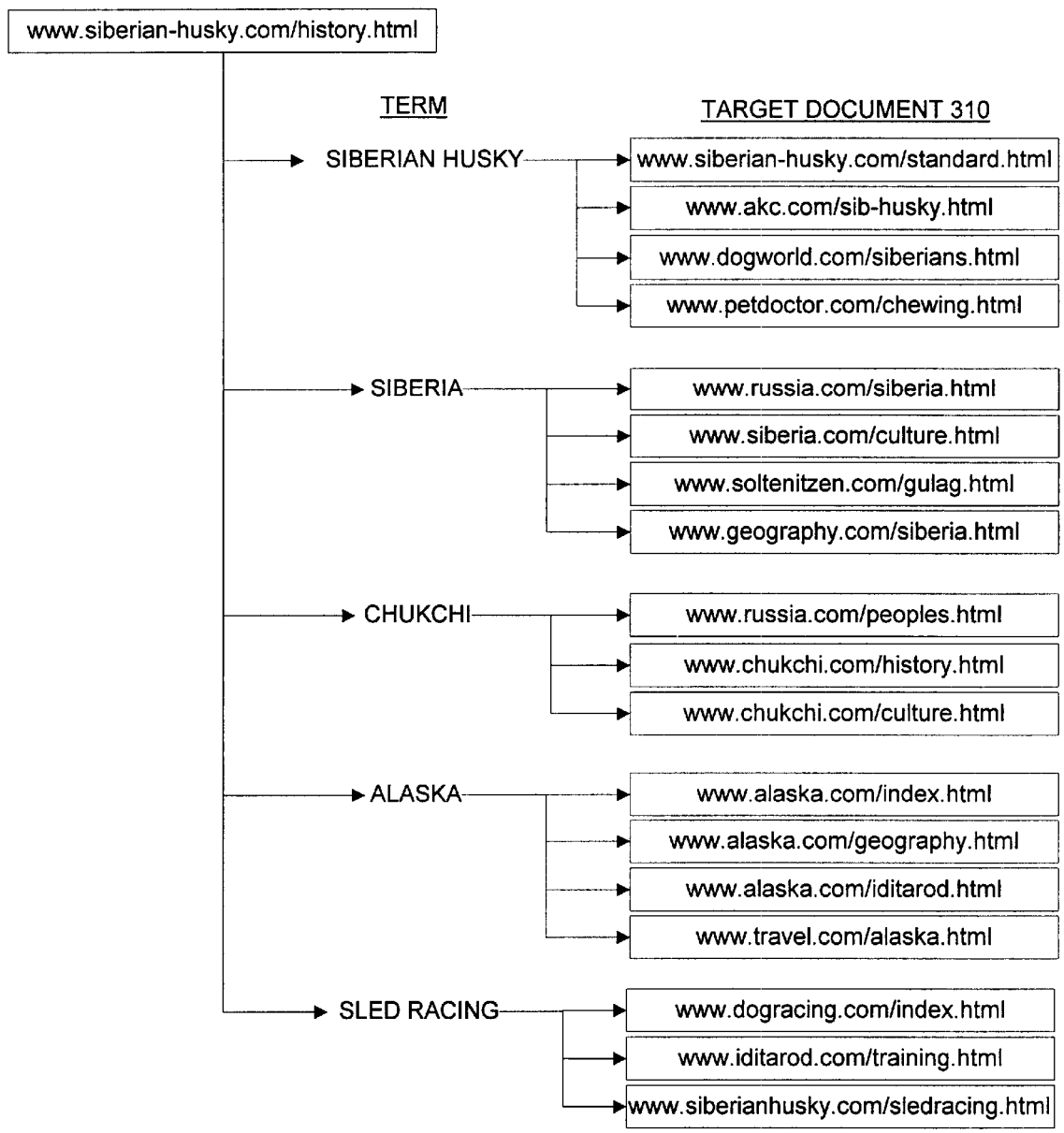
FIG. 5 is an illustration of a document hierarchy following creation of new links to target documents.

Referring now to FIG. 3 there is shown an illustration of the navigational paradigm provided by the present invention. FIGS. 4a–4c illustrate an example of user interface module 120 with the user navigating through a number of example hypertext documents in accordance with this navigational paradigm. FIG. 5 illustrates a document hierarchy for the documents used in FIGS. 4a–4c.

The navigational process begins with the user viewing any arbitrary source document 300 via the user interface module 110, which may provide a standard browser type interface for navigating HTML and other web content. FIG. 4a illustrates a user interface 400 while viewing an example source document 300, here an article on Siberian Huskies.

The user selects 312 a portion of the source document. FIG. 4b illustrates the selected portion 304 of interest. At the time of selection, there are no further links from this portion of the source document 300 to any other documents.

From the selected portion 304 of the source document 300, a number of new contextual links to target documents 310 relevant to the selected portion 304 are generated 306. These new contextual links are associated with selected terms of the source document, typically, but not necessarily only, in the selected portion 304. In the example of FIG. 4c, the new links are embedded directly in the text of the source document 300, with the selected terms serving as anchors 404 for the links, shown as standard underlined text. Each of the link anchors 404 may contain a single link to a single target document 310, or multiple links to multiple different target documents 310, where selection of the link anchor 404 causes a popup menu of the target documents 310 to appear.

FIG. 5 illustrates a document hierarchy following the creation of the new links to the target documents 310, and with the selected terms each having links to multiple target documents. Prior to generation of these links, the source document 300 may have been linked by the publisher to a fixed set of documents. Once the new links are generated, the source document 300 is linked to an additional number of target documents 310.

In addition, the knowledge base 130 is preferably updated to include any new terms as topics that were not previously in the knowledge base 130, and the document collection 140 is updated to include references to the target documents 310 for the topics.

The terms selected for the links may be any terms of the selected portion, or may be other terms not necessarily appearing in the selected portion 304, but associated with topics that are most relevant to the selected portion 304. Also, while FIG. 4c illustrates the links as being anchored to terms in the text, in an alternate embodiment, the links are provided in a separate navigational component, such as the menu 408 illustrated in FIG. 4d.

System Operation

Figure 6:
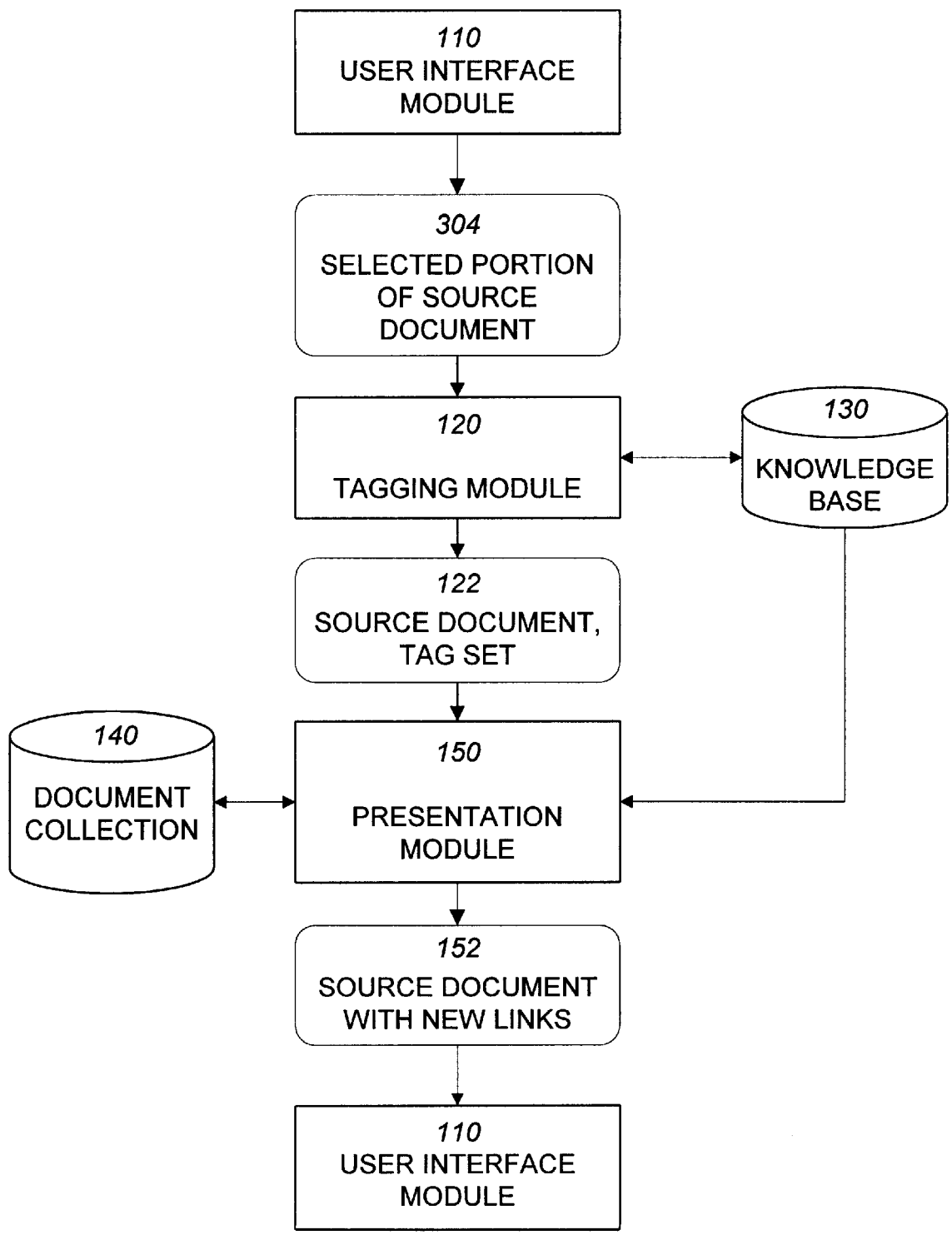
FIG. 6 is a flowgraph of one embodiment of the operation of the system for generating contextual links in a source document.

Referring now to FIG. 6 there is shown a flowgraph of one embodiment of a process for generating links in a source document. The user interface module 110 presents a source document 300 to the user for display, for example, as the user is browsing a local intranet or the Internet. The user selects a portion 304 of the source document 300, which may be the entire source document 300, or any lesser portion of it, such as a selected set of words, a sentence, paragraph, or the like. The selected portion 304 is provided to the tagging module 120, which is coupled to the knowledge base 130.

The tagging module 120 determines the topics in the knowledge base 130 that are about the selected portion 304. Preferably the tagging module 120 applies some type of linguistic analysis to the selected portion, including either syntactic or semantic analysis methods to determine the topics that are most representative or relevant to the selected portion 304. The tagging module 120 adds a tag to the source document 300 for each of these topics, the tag specifying the topic in the knowledge base 130, and a term (or group of terms) of the document that can serve as a link anchor for a hyperlink. The tagging module 120 also updates the knowledge base 130 by adding new topics for important terms that were not previously included in the knowledge base 130. The tagging module 120 also updates the document collection 140 by adding new references to documents that are associated (tagged) with topics in the knowledge base 130, and that were not previously included in the document collection 140.

The presentation module 150 receives a source document including the set of tags in the document, and creates new links in the source document to other target documents. The presentation module 150 uses the knowledge base 130 to access the topics in knowledge base 130 associated with the tags. The presentation module 150 uses the document collection 140 to obtain references to the target documents associated with these topics. The presentation module 150 adds new hypertext links to the target documents to the source document, and provides the resulting source document to the user interface module 110 to display to the user. The presentation module 150 may add the new links to the source document using the selected terms as link anchors for the links, or it may create or update a navigational component apart from the body of the source document to contain the links. The resulting source document or navigational component is provided to the user interface module 110 which displays it to the user. The user may then further navigate the new links to any of the target documents, and repeat the process by selecting a portion of such target document.

Generation of Topic Tags

Figure 7:
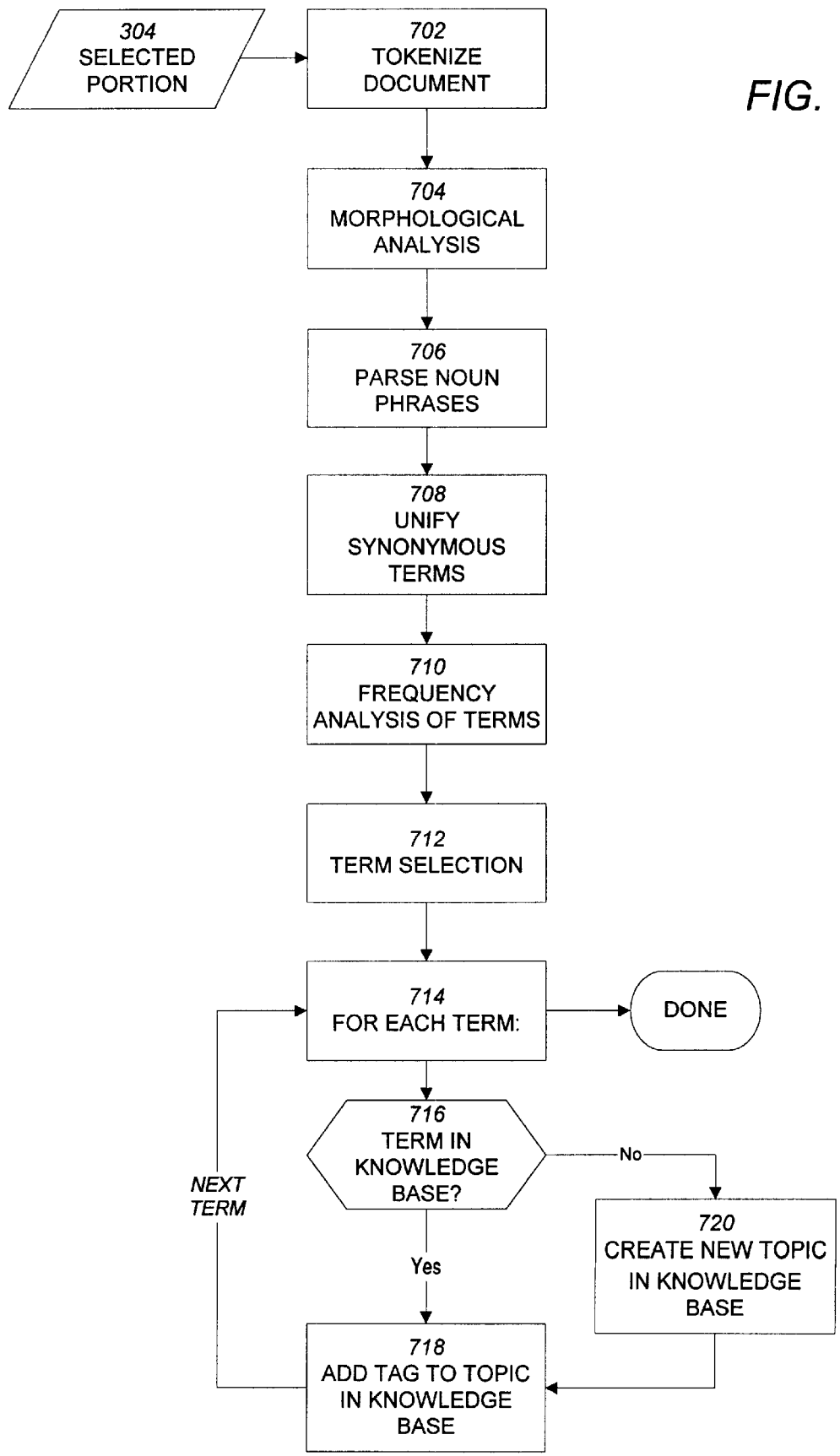
FIG. 7 is a flowgraph of one embodiment of a process for generating new tags in a source document.

Referring now to FIG. 7, there is shown a flowgraph of one embodiment of a process for selecting topics and generating tags to such topics, as preferably implemented by the tagging module 120. The input to the process is a selected portion of a source document. In this embodiment, the linguistic analysis provided by the tagging module 120 is both syntactic, processing the grammatical structure of the selected portion and words therein, and semantic, processing the meaning of selected portion by analysis of word relationships and frequencies.

Referring to the figure, the tagging module 120 tokenizes 702 the selected portion, dividing the selected portion into words and/or word phrases, each of which constitutes a token. Morphological analysis 704 reduces each of the tokens to a base form, typically a singular form for nouns and an infinitive form for verbs. One method for performing morphological analysis is to provide a list of affixes and a set of rules for removing these affixes from words to generate word base forms, and a list of word exceptions for words that have special or irregular base forms. This type of functionality is available commercially, for example, from InXight Software Inc., of Palo Alto, Calif., in the LinguistX product.

The tagging module 120 then parses 706 the tokens to recognize groups of grammatical noun phrases. Noun phrase grouping may be done using a context free grammar, or the LinguistX product. From the resulting noun phrases and noun tokens, the tagging module 120 determines which ones are synonymous, and unifies 708 these by associating them with a single unifying term, which may or may not be the same as a topic in the knowledge base 130. Noun phrases and nouns are synonymous if they share the same topic in the knowledge base 130. To determine which nouns share a same topic, the tagging module 120 looks up the noun as a term in the knowledge base 130 to identify the topic(s) associated with the noun. For example, the noun phrases "canine," and "dog" may both be unified under with the unifying topic "Dog".

Once the terms have been unified, the tagging module 120 counts 710 the number of times each term (including the synonyms) occurs in the selected portion.

The tagging module 120 then selects 712 terms from the set of unified terms, based on threshold parameters for the number of terms to be selected. Preferably the tagging module 120 selects the most frequently occurring terms given the frequency of information. The number of terms selected may be fixed (e.g., selecting the 5 most frequent terms) or varied, for example, as a function of the length of the selected portion (e.g., selecting a number of terms equal to 10% of the total number of words in the selected portion). Thus, where the selected portion 304 of the source document provides the context in which the contextual links are generated, the selection of terms for the tagging creates the specific content out of that context upon which the links will be based.

For each selected term, the tagging module 120 looks up 716 the term in the knowledge base 130. If a topic is associated with the term, then the tagging module 120 creates 718 a tag which associates the topic and the term from the document. Depending on the implementation, the tag may contain a pointer to the topic in the knowledge base 130, or the actual topic text itself. The tag is preferably stored in the source document, though it may be stored in a separate data structure.

If the term is not found in the knowledge base 130, then the tagging module 120 creates 720 a new topic in the knowledge base 130 for the term, and then creates 718 a tag referencing the term in the document, and the new topic. The tagging module 120 may provide a notification function which notifies a system administrator when a new topic is automatically added to the knowledge base 130.

When tags have been created for all of the selected terms, the tagging module 120 terminates, and passes the source document and the set of tags to the presentation module 150.

Generation of Links to Target Documents

Figure 8:
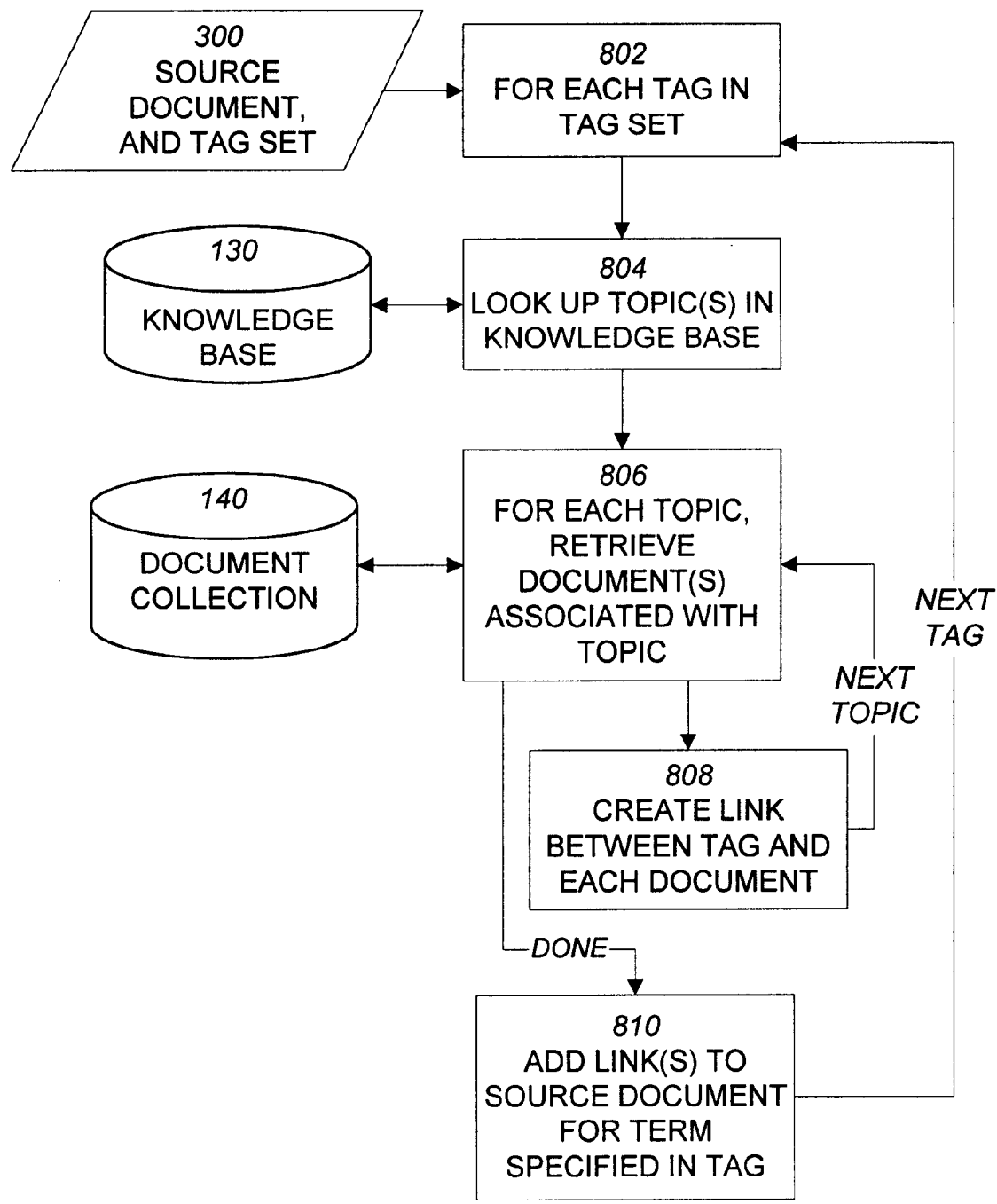
FIG. 8 is a flowgraph of one embodiment of a process for generating links for new tags.

Referring now to FIG. 8, there is a shown a flowgraph of one embodiment of a process of generating links to target documents as preferably implemented by the presentation module 150. The presentation module 150 receives the source document 300 and the set of tags created by the tagging module 120. For each tag (802), the presentation module 150 looks up 804 the topic(s) in the knowledge base 130 specified in the tag. For each such topic the presentation module 150 retrieves 806 the documents associated with the topic, or more particularly, retrieves the URL (or other specification of network location) for the document. The presentation module 150 creates 808 a link between the term in the tag, and each of the referenced documents.

When all links for the tag have been created, the presentation module 150 instantiates 810 the links in the source document by adding them to the document in association with the term for the tag. The links may be added directly in the text of the selected portion, by creating a link anchor for the term of the tag, and embedding the links at the link anchor.

If there is more then one link for the tag, then a menu of links to target documents is created at the link anchor. In this implementation, dynamic HMTL (DHTML) is used to create the menu of links, with each link being named by a simplified title. An example of DHTML code that could be instantiated for this purpose is shown below:

```
<HTML>
<body>
<object id="iepop1" classid="clsid: 7623A620-9DD9-11CF-A662-00AA00C066D2"
codebase="http://www.microsoft.com/workshop/activex/gallery/ms/popup/other/iemen
u.ocx#Version=4,70,0,1115" align="baseline" border="0" width="14" height="14"
type="application/x-ole
object">
        <param name="Menuitem[0]" value="Buying Siberians">
        <param name="Menuitem[1]" value="Showing Your Siberian">
        <param name="Menuitem[2]" value="Breeding">
        <param name="Menuitem[3]" value="Chewing Problems">
<script language="VBScript">
Sub Iepop1_Click(ByVal x)
Select Case X
        case 1 location.href="http://www.siberian-husky.com/buying.html"
        case 2 location.href="http://www.siberian-husky.com/showing.html"
        case 3 location.href="http://www.siberian-husky.com/breeding.html"
        case 4 location.href="http://www.siberian-husky.com/chewing.html"
end select
End Sub
Sub husky_onClick
Call Iepop1.PopUp
End Sub
-->
</script>
</body>
</HTML>
```

In this example, a popup menu is defined with three menu items, each with a value specifying the simplified title for the target document being linked. For each menu item there is defined an associated case with the URL for the target document. When the user selects a menu item, the menu item number is used in the case statement to select the URL, which is then retrieved and displayed to the user.

Figure 4D:
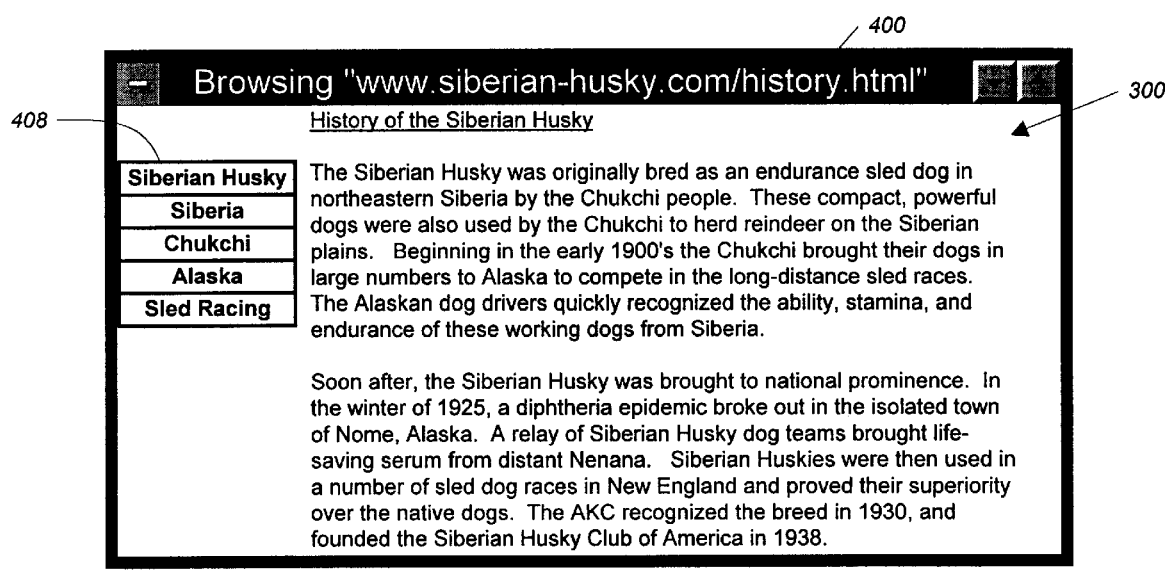

Alternatively, the presentation module 150 may create the links in a separate navigation component, such as the one illustrated in FIG. 4*d*. In this embodiment, the navigational component may be a menu including each selected term as a menu item, each of which has a sub-menu containing one or more of the contextual links to the target documents. Also, as a further embodiment, hierarchical topic menus may be created. Here, each menu item may be a topic in the knowledge base 130, with a submenu of related topics, and each related topic may have its own submenu of links to target documents. This hierarchical approach provides the user the ability to explore the entire document collection 140.

The presentation module 150 repeats the creation 808 of links for each tag in the set of tags, and then passes the resulting, modified source document to the user interface module 110 for displaying to the user. The user can then traverse any of the new links in the source document to one of the target documents, and repeat the dynamic generation of contextual links by selecting a portion of the target document.

Figure 9:
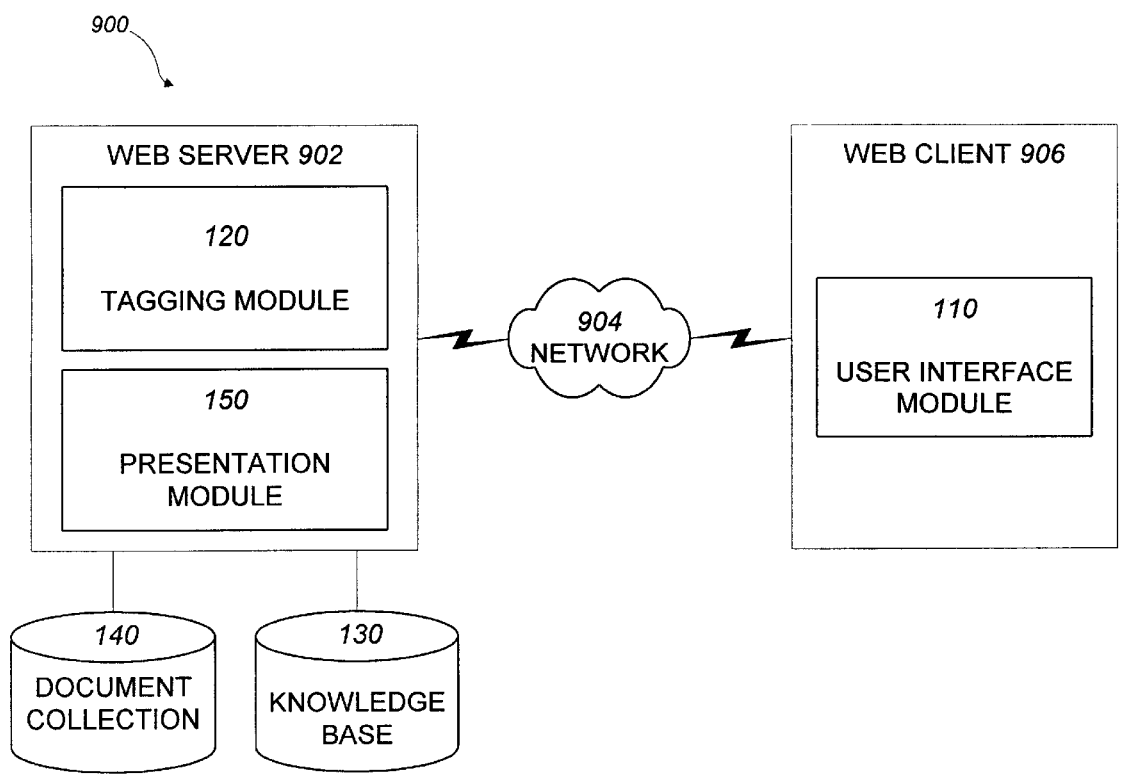
FIG. 9 is an illustration of another embodiment of the present invention in a web site.

Referring now to FIG. 9, there is shown another embodiment of the present invention in a Web site. The Web site 900 may be either an Internet site or an intranet site, in either case one based on conventional Internet protocols. In this embodiment, the Web site 900 includes a server 902 coupled to a knowledge base 130 and a document collection 140. The server 902 includes the tagging module 120 and the presentation module 150, operating in the manner described above. These modules are accessed via conventional CGI protocols.

Coupled to the server 902 via an Internet type network connection 904 is a web client 906. The client 906 includes the user interface module 110, preferably as part of a browser software product or similar product capable of accessing HTML-based information.

The server 902 serves a page of document to the client 906 which displays the page to the user. The user selects a portion of the page, and submits (e.g., via post method) back to the server 902. The server 902 passes the selected portion to the tagging module 120 which generates the tags for the selected portion. The presentation module 150 dynamically constructs a new page containing contextual links for the generated tags. The server 902 dynamically reformats the page with the contextual links, either in the text or in a navigational component. This reformatted page, basically an entirely new page, is served back to the client 906, which again displays it to the user in the user interface module 110. The user may repeat this navigation process by further selection of the contextual links.

The Web site 900 may also be used in other scenarios as well. In one scenario, the Web site 900 embodiment may be used for the static (off-line) generation of tags, and the dynamic (real-time) generation of contextual links. In this scenario, during creation of the Web site 900, the publisher uses the tagging module 120 to automatically generate the tags for a document to be included in the Web site 900. These tags will be fixed at this point, establishing the terms or phrases in the document that the user will be allowed to update to contextual links to other documents. Subsequently, when the document is accessed by a user's client 906, the tags are already determined, but contextual links are then dynamically determined by the presentation module 150 to available target documents. This scenario permits the contextual links in the source document to be current at all times, while giving the publisher editorial control over which tags and keywords are used as the basis for the contextual links.

Finally, the Web site 900 embodiment can be used for both static creation of tags and contextual links. In this scenario the publisher again automatically generates tags for a document to be published via the tagging module 120, rather than manually defining the tags. In addition, the publisher also uses the presentation module 150 to automatically generate the contextual links for the document. The document then is published on the Web site 900 so that the tags and contextual links are fixed when accessed by the user. However, the publisher is able at any time to update the tags or links of the document using the automatic generation capabilities of the tagging module 120 and the presentation module 150.

Those of skill in the art will appreciate that while the present invention is particularly useful when implemented in a Web site, the particular use of Internet and Web technologies is not required for the present invention. Hyperlinked documents and information retrieval systems based on other technologies may also be used in conjunction with the present invention.

In summary, the present invention provides a system and method for the dynamic generation of contextual links to a selected portion of any source document. The contextual links provide the user with access to target documents that are relevant to the selected portion. The contextual links are generated from a linguistic analysis of the selected portion which identifies particular terms or keywords that are relevant to or about the selected portion. From these terms, target documents are identified, preferably using a database which associates the terms with topics, and the topics with documents. The contextual links are then provided to the user either by embedding them in the text of the source document or in a separate navigational component.

We claim:

1. A computer-implemented method of dynamically generating hypertext links from a source document to at least one document other than the source document, comprising:

receiving a user selected portion of the source document;

selecting a plurality of terms from the user selected portion; and for at least one selected term, automatically creating at least one hypertext link to a document, other than the source document, relevant to the term.

2. The computer-implemented method of claim 1, wherein for the selected term, automatically creating a hypertext link to a document relevant to the term includes:

determining for each selected term at least one topic associated with the term; and determining for each topic associated with the term a link to the at least one document associated with the topic.

3. The method of claim 1, wherein selecting a plurality of terms from the user selected portion includes:

selecting a number of the most frequently occurring terms in the user selected portion.

4. The method of claim 3, further including:

parsing the selected portion into a plurality of terms;

associating groups of synonymous terms with a single unifying term;

determining the frequency of each unifying term by counting the number of synonymous terms associated with the unifying term;

selecting the most frequently occurring unifying terms.

5. The method of claim 4, wherein associating groups of synonymous terms with a single unifying term includes determining synonymous terms as terms associated with a same topic in a plurality of topics.

6. The method of claim 1, wherein for each selected term, automatically creating a hypertext link to at least one other document relevant to the term further includes:

for each selected term, creating a menu of hypertext links to the at least one document relevant to the selected term using the selected term as a link anchor.

7. The method of claim 1, wherein for each selected term, creating at least one hypertext link to at least one document, other than the source document, relevant to the term further includes:

creating a menu of links apart from the source document, the menu including each selected term as a menu item, and including for each selected term, a sub-menu including the at least one hypertext link to the the at least one document relevant to the term.

8. A computer-implemented system for dynamically generating content dependent hypertext links in a source document to link from the source document to at least one other document other than the source document, the system comprising:

a knowledge base storing a plurality of topics, each topic associated with at least one term semantically related to the topic, each topic further associated with the at least one document that is about the topic;

a tagging module communicatively coupled to the knowledge base, that receives a user selected portion of the source document, and determines topics in the knowledge base associated with the selected terms relevant to the user selected portion; and a presentation module communicatively coupled to the knowledge base, that receives the user selected portion of the source document and the selected terms determined by the tagging module, and for each selected term, determines the topics associated with the term, and the at least one document associated with each topic, creates hypertext links to the at least one document associated with the topics, and associates the hypertext links with the source document.

9. The system of claim 8, further comprising:

a web site including a web server executing the tagging module and the presentation module.

10. A computer-implemented method of dynamically generating hypertext links in a source document, comprising:

receiving a user selected portion of the source document;

selecting from the user selected portion a plurality of the most frequently occurring terms;

for each selected term:

determining at least one topic of which the selected term is descriptive;

for each topic, determining at least one document other than the source document associated with the topic; and creating a hypertext link from the selected term to each document other than the source document associated with each of the topics of which the selected term is descriptive.

11. A computer-implemented method of dynamically generating hypertext links from a source document to at least one document other than the source document, the method comprising:

receiving a user selected portion of the source document; and for at least one term in the user selected portion, automatically creating at least one hypertext link to a document, other than the source document, relevant to the term.

12. The computer-implemented method of claim 11, wherein for the at least one term, automatically creating a hypertext link to a document relevant to the term includes:

determining for the term at least one topic associated with the term;

determining for each topic associated with the term a link to the at least one document associated with the topic; and providing the hyperlink to the at least one document within the source document.

13. The computer-implemented method of claim 11, wherein for the at least one term, automatically creating a hypertext link to a document relevant to the term includes:

determining for the term at least one topic associated with the term;

determining for each topic associated with the term a link to the at least one document associated with the topic; and creating a menu of the hypertext links to the document.

* * * * *